(12) United States Patent
Schlegel (10) Patent No.: US 11,777,254 B2
(45) Date of Patent: Oct. 3, 2023

(54) PLUG-IN CONNECTOR (71) Applicant: HARTING ELECTRIC GMBH & CO. KG, Espelkamp (DE)

(72) Inventor: Bernard Schlegel, Rahden (DE)

(73) Assignee: HARTING ELECTRIC GMBH & CO. KG

( * ) Notice: Subject to any disclaimer, the term of this patent is extended or adjusted under 35 U.S.C. 154(b) by 535 days.

(21) Appl. No.: 16/610,443

(22) PCT Filed: Nov. 30, 2018

(86) PCT No.: PCT/DE2018/100978
§ 371 (c)(1),
(2) Date: Nov. 1, 2019

(87) PCT Pub. No.: WO2019/114866
PCT Pub. Date: Jun. 20, 2019

(65) Prior Publication Data
US 2020/0321729 A1 Oct. 8, 2020

(30) Foreign Application Priority Data
Dec. 14, 2017 (DE) ..................... 10 2017 130 005.8

(51) Int. Cl.
| | |
|---|---|
| *H01R 13/627* | (2006.01) |
| *F16B 21/07* | (2006.01) |
| *F16B 21/18* | (2006.01) |

(52) U.S. Cl.
CPC ....... *H01R 13/6277* (2013.01); *F16B 21/073* (2013.01); *F16B 21/078* (2013.01); *F16B 21/186* (2013.01)

(58) Field of Classification Search
CPC ...... F16B 21/18; F16B 21/183; F16B 21/186; F16B 21/073; F16B 21/078; F16B 21/125;
(Continued)

(56) References Cited

U.S. PATENT DOCUMENTS

| | | | |
|---|---|---|---|
| 1,965,939 A | 7/1934 | Jacobi | ............................. 70/29 |
| 3,046,513 A | 7/1962 | Crowley | ........................ 339/91 |

(Continued)

FOREIGN PATENT DOCUMENTS

| | | | | |
|---|---|---|---|---|
| CA | 2 686 893 | 6/2010 | ............ | E05B 57/00 |
| CN | 101748941 | 6/2010 | ............ | E05B 65/00 |

(Continued)

OTHER PUBLICATIONS

U.S. Appl. No. 16/629,503, filed Jan. 8, 2020, Schlegel et al.
(Continued)

*Primary Examiner* — Jonathan P Masinick
(74) *Attorney, Agent, or Firm* — HAYES SOLOWAY P.C.

(57) ABSTRACT

A plug-in connector has two pushbuttons arranged laterally thereon. An annular, asymmetric spiral spring is inserted in such a manner that the spiral spring, in its locking orientation, permits the respective pushbutton pin to move into the plug-in connector housing and prevents the pushbutton pin from moving out of the plug-in connector housing. The spiral spring can tilt from its locking orientation into its release orientation when arranged with its inner region in a release groove of the pushbutton pin. In its release orientation, the spiral spring permits the pushbutton pin to move out of the plug-in connector housing. This permits actuation similar to a ballpoint pen with only a few components and with high operating comfort.

18 Claims, 7 Drawing Sheets

(58) Field of Classification Search
CPC ............... Y10T 403/58; Y10T 403/587; Y10T 403/581; H01R 13/6277; F16L 37/084
USPC .......................................................... 403/316
See application file for complete search history.

(56) References Cited

U.S. PATENT DOCUMENTS

| | | | | |
|---|---|---|---|---|
| 3,606,406 | A * | 9/1971 | Walters | F16B 21/02 403/240 |
| 4,120,553 | A | 10/1978 | Muz | 339/91 R |
| 4,146,682 | A | 3/1979 | Nakao | 429/97 |
| 4,179,143 | A | 12/1979 | Shy | 292/179 |
| 4,227,762 | A | 10/1980 | Scheiner | 339/91 R |
| 4,774,399 | A | 9/1988 | Fujita et al. | 235/441 |
| 4,843,477 | A | 6/1989 | Mizutani et al. | 358/248 |
| 4,872,710 | A * | 10/1989 | Konecny | F16L 37/084 285/321 |
| 4,941,841 | A | 7/1990 | Darden et al. | 439/377 |
| 5,161,838 | A * | 11/1992 | Ely | G09F 3/0382 292/327 |
| 5,207,544 | A | 5/1993 | Yamamoto et al. | 411/348 |
| 5,220,520 | A | 6/1993 | Kessoku | 364/708 |
| 5,409,393 | A | 4/1995 | Perkins et al. | 439/347 |
| 5,474,309 | A | 12/1995 | Balsells | 277/163 |
| 5,588,862 | A | 12/1996 | Perkins et al. | 439/347 |
| 5,603,630 | A | 2/1997 | Villain | 439/347 |
| 5,615,250 | A | 3/1997 | Kobayashi | 379/61 |
| 5,658,162 | A | 8/1997 | Harting et al. | 439/372 |
| 5,716,730 | A | 2/1998 | Deguchi | 429/97 |
| 5,845,898 | A | 12/1998 | Halder et al. | 269/48.1 |
| 5,860,302 | A | 1/1999 | James | 70/63 |
| 5,865,640 | A | 2/1999 | Tadokoro | 439/347 |
| 5,903,132 | A | 5/1999 | Ohira et al. | 320/107 |
| 5,993,240 | A | 11/1999 | Schaefer | 439/347 |
| 6,168,881 | B1 | 1/2001 | Fischer et al. | 429/97 |
| 6,356,053 | B1 | 3/2002 | Sandoz et al. | 320/115 |
| 6,450,828 | B1 | 9/2002 | Gordon | 439/347 |
| 6,469,900 | B2 | 10/2002 | Cheng | 361/726 |
| 6,757,172 | B2 | 6/2004 | Maruyama | 361/737 |
| 6,767,230 | B2 | 7/2004 | Lai | 439/153 |
| 6,942,514 | B1 | 9/2005 | Cheng et al. | 439/328 |
| 6,943,527 | B2 | 9/2005 | Liu et al. | 320/107 |
| 7,080,889 | B2 | 7/2006 | Ling et al. | 300/334 |
| 7,364,452 | B2 | 4/2008 | Carver et al. | 439/310 |
| 7,817,414 | B2 | 10/2010 | Chou et al. | 361/679.41 |
| 8,092,241 | B2 | 1/2012 | Chang | 439/305 |
| 8,328,562 | B1 | 12/2012 | Rassoolkhani et al. | 439/34 |
| 8,444,190 | B2 | 5/2013 | Schmidt et al. | 292/202 |
| 8,498,123 | B2 | 7/2013 | Kawada et al. | 361/732 |
| 8,549,724 | B2 | 10/2013 | Davies | 29/525.01 |
| 8,591,160 | B2 | 11/2013 | Shinozaki | 411/347 |
| 8,951,060 | B2 | 2/2015 | Meyer-Ebeling | H01R 13/639 |
| 8,961,213 | B2 | 2/2015 | Retailleau et al. | H01R 13/639 |
| 9,093,789 | B2 | 7/2015 | Aoki | H01R 13/641 |
| 9,228,602 | B2 | 1/2016 | Kelly et al. | F16B 21/073 |
| 9,312,630 | B2 | 4/2016 | Huang | H01R 13/62 |
| 9,458,868 | B2 | 10/2016 | Mettern et al. | F16B 5/0621 |
| 9,482,255 | B2 | 11/2016 | Changsrivong et al. | F16B 17/00 |
| 9,518,626 | B2 * | 12/2016 | Balsells | B21F 35/00 |
| 9,829,028 | B2 | 11/2017 | Changsrivong et al. | F16B 21/125 |
| 10,320,100 | B2 | 6/2019 | Phillips | H01R 12/7005 |
| 10,826,235 | B2 | 11/2020 | Shain | H01R 13/6275 |
| 10,975,982 | B2 | 4/2021 | Wilhelm | F16K 35/025 |
| 2008/0250550 | A1 | 10/2008 | Bologna et al. | 2/425 |
| 2010/0090379 | A1 * | 4/2010 | Balsells | F16L 37/122 267/1.5 |
| 2012/0034804 | A1 * | 2/2012 | Smith | F16F 1/045 439/345 |
| 2012/0208407 | A1 * | 8/2012 | Leon | H01R 13/17 439/817 |
| 2012/0301248 | A1 | 11/2012 | Arnold et al. | 411/347 |
| 2013/0149029 | A1 * | 6/2013 | Changsrivong | A61N 1/3752 403/361 |
| 2013/0149031 | A1 * | 6/2013 | Changsrivong | F16B 21/186 403/376 |
| 2013/0210258 | A1 | 8/2013 | Retailleu et al. | H01R 13/639 |
| 2013/0330120 | A1 | 12/2013 | Blanchard | F16B 21/165 |
| 2014/0130329 | A1 | 5/2014 | Changsrivong et al. | F16B 17/00 |
| 2014/0259617 | A1 * | 9/2014 | Kompa | B23P 11/00 267/167 |
| 2016/0032952 | A1 | 2/2016 | McBroom et al. | F16G 5/06 |
| 2017/0373427 | A1 * | 12/2017 | Kompa | H01R 13/17 |
| 2018/0138633 | A1 * | 5/2018 | DeWitt | H01R 13/5219 |
| 2020/0224701 | A1 | 7/2020 | Schlegel | F16B 21/186 |
| 2020/0321729 | A1 | 10/2020 | Schlegel | H01R 13/6277 |
| 2021/0131472 | A1 | 5/2021 | Schlegel et al. | F16B 21/165 |

FOREIGN PATENT DOCUMENTS

| | | | |
|---|---|---|---|
| CN | 101981329 | 2/2011 | ............... F16B 19/00 |
| CN | 103375460 | 10/2013 | ............... F16B 21/08 |
| CN | 103748367 | 4/2014 | ............... F16B 5/06 |
| CN | 203573876 U * | 4/2014 | |
| CN | 104121264 | 10/2014 | ............... F16B 21/00 |
| DE | 7343790 | 3/1974 | ............... H01R 13/48 |
| DE | 69206597 | 5/1996 | ............... B60R 21/20 |
| DE | 19643708 | 8/2000 | ............... F16B 19/10 |
| DE | 102008060561 | 7/2010 | ............... H05K 5/02 |
| EP | 0379159 | 7/1990 | ............... H05K 9/00 |
| EP | 0731534 | 9/1996 | ............ H01R 13/629 |
| EP | 2194217 | 6/2010 | ............... E05B 13/10 |
| EP | 2194217 A1 * | 6/2010 | ............ E05B 13/105 |
| EP | 2259383 | 12/2010 | ............ H01R 13/187 |
| EP | 2733366 | 5/2014 | ............... F16B 21/06 |
| EP | 2746599 | 6/2014 | ............... F16B 21/06 |
| EP | 2801726 | 11/2014 | ............... F16B 21/16 |
| EP | 2602494 | 7/2017 | ............... A61N 1/375 |
| WO | WO2009126968 | 10/2009 | ............... F16L 39/00 |

OTHER PUBLICATIONS

U.S. Appl. No. 16/639,034, filed Feb. 13, 2020, Schlegel.
Chinese Office Action issued in Chinese Patent Appln. No. 201880071664.3, dated Feb. 22, 2021, with machine English translation, 10 pages.
Chinese Office Action issued in Chinese Patent Appln. No. 201880053305.5, dated Feb. 3, 2021, with English translation, 12 pages.
Chinese Office Action issued in Chinese Patent Appln. No. 201880068304.8, dated Mar. 17, 2021, with English translation, 13 pages.
German Office Action (w/machine translation) issued in application No. 10 2018 101 789.8, dated Dec. 19, 2018 (10 pgs).
German Office Action (w/machine translation) issued in application No. 10 2017 118 918.1, dated Jun. 28, 2018 (10 pgs).
International Search Report (w/translation) issued in application No. PCT/DE2018/100693, dated Nov. 16, 2018 (6 pgs).
International Search Report and Written Opinion (w/translations) issued in application No. PCT/DE2018/100694, dated Nov. 19, 2018 (17 pgs).
International Search Report and Written Opinion (w/translations) issued in application No. PCT/DE2018/100693, dated Nov. 19, 2018 (19 pgs).
International Preliminary Report on Patentability (English translation) issued in application No. PCT/DE2018/100694, dated Feb. 18, 2020 (8 pgs).
International Preliminary Report on Patentability (English translation) issued in application No. PCT/DE2018/100693, dated Feb. 27, 2020 (10 pgs).
Krause, W., Construction Elements of Precision Engineering (no translation available), vol. 1, 3$^{rd}$ revised edition. Munich: Hanser 2004, pp. 448-449 (3 pgs).
International Preliminary Report on Patentability (English translation) issued in application No. PCT/DE2018/100978, dated Jun. 16, 2020 (8 pgs).

(56) References Cited

OTHER PUBLICATIONS

Notice of Allowance issued in U.S. Appl. No. 16/629,503, dated Apr. 11, 2022, 28 pages.
German Office Action (w/machine translation) issued in application No. 10 2017 130 005.8, dated Jul. 18, 2018 (7 pgs).
International Search Report (w/translation) and Written Opinion (w/machine translation) issued in application No. PCT/DE2018/100978, dated Mar. 22, 2019 (16 pgs).

* cited by examiner

Prior Art

Prior Art

PLUG-IN CONNECTOR

The invention is based on a plug-in connector.

Lockable plug-in connectors are required in order for example to transmit electrical signals and electrical energy in a reliable fashion.

PRIOR ART

The prior art discloses asymmetric, annular coil springs. In some cases, these are known as "canted coil springs" and/or under the name "Bal Seal springs". In particular, such springs have been disclosed by the US American company "Bal Seal Engineering", amongst others from a plurality of patent applications.

Publication EP 0 379 159 B1, which forms the basis for this, explains in detail the design of such an asymmetric coil spring. Its function as a screening seal for electronic/electromagnetic interface components is also explained in detail.

Publication U.S. Pat. No. 5,474,309 A describes such an asymmetric annular coil spring which is formed from a plurality of individual coils that are preferably formed as ovals, each having a large axis and a small axis.

Publication EP 2 259 383 B1 discloses a connector which in practice may be used for example in the form of a keyring, for convenient, releasable, mechanical fixing of objects to a bunch of keys. This connector has a pin arranged in a housing bore. The housing bore has a housing channel with a canted coil spring arranged therein. The coil spring has a large axis and small axis. The pin has two grooves, which in this publication are described as the pin groove and the second groove. The coil spring is held in a first spring position by the housing channel and the pin groove. The second groove of the pin serves to receive the canted coil spring when the pin is inserted more deeply into the housing in a first insertion direction. The second groove is larger than the pin groove. Thus the coil spring can assume at least two positions. In the first spring position, the pin cannot be withdrawn from the housing against the insertion direction. In a second spring position, the pin can be withdrawn from the housing against the insertion direction because of the second twist angle of the canted coil spring.

The prior art furthermore discloses two locking devices for plug-in connectors.

Publication EP 0 731 534 B1 describes a U-shaped locking bracket which can be pivoted about bearing pegs of a housing half. The U-shaped locking bracket has pockets, each of which holds a spring element. On closure of the locking bracket, these spring elements act on the locking pegs of the other housing half such that the housing halves are pressed together in sprung fashion. Furthermore, the use of a locking element in the form of a rocking lever is disclosed as an advantageous embodiment. This design allows a good ratio between operating force and holding force.

A further locking device for an at least two-piece housing is described in publication DE 10 2008 060 561 A. A control button which can be operated from the outside is arranged inside circular moldings on at least one of two opposing side walls of the housing upper half. The control button is formed as a combined rotary and pushbutton, and stands in engagement with a spring lever arranged in the interior of the housing upper part. The spring lever creates a locking connection between the two housing parts depending on the position of the control button. It is furthermore disclosed that a colored marking indicates the locking connection between the two housing parts.

The disadvantage with this prior art is that operation of such a control device requires relatively great complexity.

The German Patent and Trademark Office has researched the following prior art in the priority application of the present application: EP 2 746 599 A2, US 2013/0149031 A1, WO 2009/126968 A1 and U.S. Pat. No. 9,482,255 B2.

OBJECT

The object of the invention is to make operation of such a locking device of a plug-in connector particularly simple.

SUMMARY

A plug-in connector comprises at least the following:
a plug-in connector housing with at least one passage opening having a housing channel;
at least one pushbutton having a pushbutton pin which is arranged at least partially in the at least one passage opening and has at least two circumferential grooves, namely a locking groove and a release groove;
an annular, asymmetric coil spring which is arranged in each passage opening with its outer region in the housing channel and which may assume at least two different orientations relative to the passage opening and to the pushbutton pin, namely a locking orientation and a release orientation,
wherein in its locking orientation, the asymmetric coil spring allows the pushbutton pin to move into the plug-in connector housing and prevents the pushbutton pin from moving out of the plug-in connector housing, and
wherein in its release orientation, the asymmetric coil spring allows the pushbutton pin to move out of the plug-in connector housing and prevents the pushbutton pin from moving into the plug-in connector housing, and
wherein the asymmetric coil spring can be tilted from its locking orientation into its release orientation when it is arranged with its inner region in the release groove,
wherein the pushbutton pin also has a third circumferential groove, namely a holding groove,
wherein the asymmetric coil spring can be tilted from its release orientation into its locking orientation when it is arranged with its inner region in the holding groove.

Here and in the text below, the asymmetric coil spring—the fundamental design of which is sometimes known in the prior art as the "canted coil spring" and/or under the name "Bal Seal spring"—is substantially distinguished in that its coils each have a large axis and a small axis. As a result, in the present case the coil spring may assume at least two different orientations relative to the passage opening and the pushbutton pin, namely the locking orientation and the release orientation. In particular, the coils may be designed to be oval. Furthermore, in their starting position, i.e. in the non-mounted state and without the action of mechanical forces, they may have a considerable inclination towards the ring plane. The plane of each coil may therefore form an angle to the ring plane which deviates substantially from 90°, i.e. is greater than 98° or less than 82°, in particular greater than 106° or less than 74°, particularly preferably greater than 114° or less than 66°. For the disclosure of an asymmetric coil spring known from the prior art, which may be used for the above-mentioned plug-in connector, express reference is made at this point to publications EP 0 379 159

B1, U.S. Pat. No. 5,474,309 A and EP 2 259 383 B1, the content of which is included as appropriate in the disclosure content of the present application.

A system of the above-mentioned plug-in connector and a counter plug-in connector which can be locked thereto is characterized in that the counter plug-in connector has a counter plug-in connector housing, wherein the counter plug-in connector housing has at least one locking opening in which the at least one pushbutton of the plug-in connector engages with a freestanding end in the locked state.

A method for locking a plug-in connector housing, in particular the above-mentioned plug-in connector housing, to a counter plug-in connector housing, in particular the above-mentioned counter plug-in connector housing, has the following steps:

A. joining the plug-in connector housing to the counter plug-in connector housing:
B. pressing a pushbutton into the plug-in connector housing in a first direction by a first distance, wherein
   b1 a pushbutton pin of the pushbutton is pressed into a passage opening of the plug-in connector housing, whereby
   b2 an annular, asymmetric coil spring which is arranged with its outer region in a housing channel of the passage opening and is arranged with its inner region in a circumferential holding groove of the pushbutton pin, initially in its release orientation, is tilted into its locking orientation, whereupon
C. the asymmetric coil spring moves along the pushbutton pin relative thereto by the first distance and thus is brought into its locking orientation with its inner region in a circumferential locking groove of the pushbutton pin, in order thereby to lock the plug-in connector housing to the counter plug-in connector housing.

In particular, unintentional release of the locking can be prevented by the following subsequent method steps:
D. abutting of a pushbutton head of the pushbutton pin on at least one polarization peg arranged in the passage opening while the inner region of the asymmetric coil spring is in the locking groove, and at the same time
E. locking of the plug-in connector housing to the counter plug-in connector housing by corresponding fixing of the pushbutton pin in its locking position on the plug-in connector housing.

A method for releasing a plug-in connector housing, in particular the above-mentioned plug-in connector housing, previously locked according to the method described above, from the counter plug-in connector housing, has the following steps:
F. rotation of the pushbutton about an axis of symmetry of its pushbutton pin into a release position, wherein
   f1 at least one polarization recess of the pushbutton pin is brought into the vicinity of the at least one polarization peg of the passage opening,
G. further pressing of the pushbutton into the passage opening of the plug-in connector housing in the first direction by a second distance, wherein
   g1 the pushbutton head also dips into the passage opening, wherein its at least one polarization recess surrounds the at least one polarization peg of the passage opening, and wherein
   g2 the inner region of the coil spring, oriented in its locking orientation, is withdrawn from the circumferential locking groove of the locking pin of the pushbutton and moved along the pushbutton pin by the second distance to reach the release groove of the pushbutton pin,
H. whereupon
   h1 an even deeper pressing-in of the pushbutton is prevented by an inner contour of the passage opening, while at the same time
   h2 the coil spring, oriented in its locking orientation, dips with its inner region into the release groove,
I. whereupon
   i1 a further spring element moves the pushbutton initially only slightly in the second direction opposite the first direction, wherein
   i2 the coil spring with its inner region arranged in the release groove is tilted from its locking orientation into its release orientation, whereupon
J. the pushbutton head is pressed by the second spring element out of the plug-in connector housing in the second direction both by the second distance and by the first distance, until finally
K. the inner region of the coil spring dips into a holding groove of the pushbutton pin and holds the pushbutton in its release position on the plug-in connector housing, whereby
L. the plug-in connector housing is released from the counter plug-in connector housing.

Advantageously, the pushbutton may have a freestanding end which points in the insertion direction in mounted state. With this freestanding end, the pushbutton pin, which has been guided through the passage opening of the plug-in connector housing into the interior of the plug-in connector housing, may for example engage in a locking opening of the counter plug-in connector housing in order to lock the plug-in connector housing to the counter plug-in connector housing. In particular, the freestanding end of the pushbutton pin may be designed tapering in conical fashion, whereby already a degree of sealing effect can be achieved, in which the housing halves can be pressed against each other in the plug-in direction.

In a further preferred embodiment, the freestanding end of the pushbutton pin may cooperate with a further mechanism for locking the plug-in connector housing to the counter plug-in connector housing. Preferably, this mechanism may serve to divert the force of the inserted pushbutton pin at right angles, and advantageously, on locking, pull and/or press the plug-in connector housing and counter plug-in connecting housing against each other in a particularly tight fashion. In particular, the housing contours and special additional components may be involved in this mechanism.

In method step H, the prevention of the even deeper pressing-in of the pushbutton by the inner contour of the passage opening, described under point h1, may be achieved for example in cooperation with the further spring element and the pushbutton head. For example, the further spring element may be already maximally compressed in this position of the pushbutton. Thus in this position, the pushbutton head presses against a first end of the already fully compressed further spring element, and is hence definitively prevented from moving even deeper into the plug-in connector housing by the inner contour, against which the second end of the spring element abuts.

One advantage of the plug-in connector lies in its particularly simple operation since it can be locked and released with one hand. Both the locking and the release take place in particular by pressing together the two pushbuttons arranged on the plug-in connector housing.

An additional advantage of the plug-in connector is that its locking mechanism can be produced mechanically very simply and hence economically. Advantageously, for fixing (locking) and for release (unlocking) of the pushbutton in corresponding positions and directions on the plug-in connector housing, the locking mechanism may comprise very few components, namely the pushbutton, the asymmetric coil spring and the spring element provided for applying the return force, and furthermore evidently the plug-in connector housing itself which is to be locked to the counter plug-in connector housing and has the associated passage opening with the corresponding contours.

A further advantage is that the use of the locking and release of the plug-in connector is largely self-explanatory, namely similar to that of a so-called "ballpoint pen mechanism". Also, the rotation of the pushbutton, described in the above-mentioned release method under point F, which is necessary or at least advantageous for release, may in particular be supported by the shape and/or color and/or feel and/or by corresponding sounds of the pushbutton and/or plug-in connector housing, in particular in cooperation of the pushbutton with the plug-in connector housing, such that this part of the operation is self-evident to the user.

Advantageous embodiments of the invention are described in the subclaims.

For the sake of completeness, it is pointed out that in a particularly preferred embodiment, the lockable plug-in connector comprises at least one contact carrier fixed in the plug-in connector housing. At least one contact is arranged in the contact carrier, which is also known as an insulating body. In particular, this contact is an electrical and/or optical and/or pneumatic contact. For example, such a contact has a plug-in region and a cable connecting region. This cable connecting region serves to supply the contacts with corresponding digital and/or analog signals and/or with energy. Furthermore, at least one cable insertion opening may be arranged in the plug-in connector housing for insertion of the electrical and/or optical and/or hydraulic cable. In particular, the plug-in connector may have means for fixing the inserted cable, for example a cable screw. On the plug side, the plug-in connector is provided amongst others with a corresponding plug opening and in particular a corresponding so-called "plug face" for connection to a corresponding counter plug-in connector, e.g. for signal and/or energy transmission. The plug-in connector may also have a so-called "holder frame" and several insulating bodies arranged therein in the form of so-called "plug-in connector modules". Furthermore, the plug-in connector may consist at least partly of metal and be designed for high current intensities and/or voltages, e.g. current intensities above 50 Ampere, in particular more than 100 Ampere, preferably current intensities of more than 250 Ampere, in particular current intensities of more than 500 Ampere. Alternatively or additionally, voltages above 60 V, in particular above 220 V, for example above 600 V, and also voltages above 1000 V may be transmitted via such a plug-in connector. For earth protection, the plug-in connector may have at least one PE (protective earth) contact, for example in the form of a PE screw.

Preferably, the plug-in connector is a rectangular plug-in connector. The plug-in connector housing may thus have two mutually opposing parallel wide sides and, at right angles thereto, two mutually opposing parallel narrow sides. Furthermore, the plug-in connector housing may have two passage openings, one of which is preferably arranged in each of the two narrow sides. The plug-in connector may furthermore have two pushbuttons and two asymmetric coil springs, wherein a pushbutton with its pushbutton pin and one of the asymmetric coil springs is arranged in each of the passage openings. This has the advantage of simple operation, since for locking it is merely necessary to move the two pushbuttons towards each other, i.e. advantageously, the user can press them together with one hand. Also, this method of operation may be automated particularly advantageously, for example by a corresponding electromechanical device. In this way, for example, "pulling under load" may be avoided.

In a preferred embodiment, the release groove and the holding groove are each deeper and/or wider than the locking groove. This has the advantage that the coil spring has sufficient play in the release and/or holding groove to change its respective orientation according to the movement direction of the pushbutton pin.

In particular, the locking groove may be arranged on the pushbutton pin between the release groove and the holding groove. This has the advantage that in the region between its holding groove and its release groove, the pushbutton pin with its locking groove may move past the asymmetric coil spring. A reversal of orientation of the asymmetric coil spring may take place in both the release groove and/or the holding groove. If the coil spring oriented in its locking orientation dips its inner region into the locking groove, this advantageously creates a particularly strong latching of the pushbutton against moving out of the plug-in connector housing, and thus advantageously increases the operating reliability of the plug-in connection. The pushbutton is then in its position locking the plug-in connector housing.

In a preferred embodiment, the pushbutton has a pushbutton head, in particular opposite its freestanding end, with a larger diameter than that of the pushbutton pin. Alternatively or additionally, the pushbutton head may also have moldings and/or recesses and/or further stop means. When the pushbutton is in its position locking the plug-in connector housing to the counter plug-in connector housing (locking position) and is also turned into its locking attitude, the pushbutton with its pushbutton head—or in some cases with its moldings and/or at least with one edge of the respective recesses and/or with its further stop means—may abut against at least one polarization means arranged in the passage opening. This polarization means is preferably a polarization peg. However, in an alternative and/or additional embodiment, it may also be a polarization recess and/or a polarization molding and/or a further polarization means.

Thus, in its locking position and simultaneously its locking attitude, initially it is not possible to press the pushbutton further into the plug-in connector housing. This is advantageous in particular because the locking attitude prevents an unintentional release of the plug-in connector from the counter plug-in connector housing. At the same time, the pushbutton cannot move out of the plug-in connector housing because of the locking orientation of the asymmetric coil spring, wherein this effect is further amplified in that the asymmetric coil spring engages with its inner region in the locking groove. In this state, the pushbutton is particularly reliably secured to the plug-in connector housing in its locking position.

In a preferred embodiment, for release, the pushbutton head has at least one polarization recess. By corresponding rotation of the pushbutton about the axis of its pushbutton pin, which is preferably designed to be rotationally symmetrical, the at least one polarization recess may be brought into the vicinity e.g. of the at least one polarization peg of the passage opening of the plug-in connector housing. In this way, for release, the pushbutton can be pressed out of its position locking the plug-in connection and pressed more deeply into the plug-in connector housing, wherein the at least one polarization recess surrounds the at least one polarization peg. Thus the coil spring with its inner region can reach the release groove of the pushbutton pin, tilt there into its release orientation and thus allow subsequent release of the plug-in connector housing from the counter plug-in connector housing.

In other words, in this advantageous embodiment, from its locking position, the pushbutton can only penetrate more deeply into the plug-in connector housing when the pushbutton has previously been oriented in a suitable release attitude by rotation about the axis of its pushbutton pin. This is particularly advantageous because it prevents unintentional release. In particular, it is prevented that on locking of the pushbutton, it is pressed more deeply into the plug-in connector housing than necessary for locking, and thus undesirably immediately triggers an accidental release.

The invention here makes use in particular of a secondary effect found purely empirically during development, which is that on locking and release, the pushbutton automatically turns at least slightly about the axis of symmetry of the pushbutton pin, provided that it its polarization recess is not in mechanical contact with the polarization peg. This effect may for example be provoked by the special design of the further spring element which in particular consists of a conical spring. If, in other embodiments, such an effect does not always take place automatically, it can easily be created without great complexity by means known to the person skilled in the art, e.g. by suitable e.g. thread-like contours of the polarization pin and/or the passage opening, and/or by additional corresponding components. Furthermore, the user can also easily turn the pushbutton into its locking position manually, wherein the corresponding orientation may be facilitated by text, graphic and/or colored markings, haptic and/or acoustic features, as will be explained in more detail below.

Advantageously, the pushbutton can thus be locked in its position in the passage opening, locking the plug-in connector housing to the counter plug-in connector housing, in that the inner region of the coil spring oriented in its locking orientation is arranged in the locking groove, while at the same time deeper insertion of the pushbutton is prevented by the polarization peg. This guarantees a particularly high operating reliability of the lock.

In a preferred embodiment, the plug-in connector may have at least one additional spring element, which is preferably a further coil spring, in particular a conical spring. This further spring element serves for applying a counter-force (return force) for manual actuation on locking, and thus serves for automatically moving the pushbutton out of the plug-in connector housing on unlocking. The further spring element may for example be arranged between said inner contour of the passage opening and the pushbutton head, and act on both these components in order to exert on the pushbutton a force directed away from the inner contour. In this way, the further spring element is suitable for pressing the pushbutton head away from the inner contour and hence out of the plug-in connector housing, and pressing the entire pushbutton on the plug-in connector housing back into its holding position.

The respective tilting between the release and locking orientation may be achieved in particular by a movement of the pushbutton pin into or out of the plug-in connector housing. Firstly, due to the return force of the second spring element, the asymmetric coil spring may tilt out of its locking orientation into its release orientation while it is arranged with its inner region in the release groove. Secondly, by manual movement of the pushbutton pin into the plug-in connector housing, the coil spring may also tilt out of its release orientation into its locking orientation while its inner region is arranged in the holding groove.

Furthermore, advantageous embodiments are conceivable which clarify and hence simplify operation for the user. As already stated, advantageously the pressing-in of the pushbutton for locking and release of the plug-in connector is largely self-explanatory in its application. Finally, a corresponding operation resembles a so-called "ballpoint pen mechanism" since both locking and release take place by pressing in the pushbutton. Pressing in the pushbutton is quite evident as the only sensible method of operation.

Furthermore, the rotation of the pushbutton, as described under point F of the above-mentioned release method, which is necessary or at least advantageous for release, can be explained to the user as follows for better understanding:

The pushbutton and/or the plug-in connector housing may be color-coded in the region of the pushbutton. For example, line structures which are continuous in the release position of the pushbutton may pass over the pushbutton and the plug-in connector housing. Alternatively or additionally, symbols may be provided on the pushbutton and on the plug-in connector housing, for example arrow and/or lock symbols. In a preferred embodiment, both the pushbutton and the plug-in connector housing having arrow symbols. When both arrow symbols point in the same direction, the pushbutton is in its release position.

Alternatively or additionally, in the region of the pushbutton, the plug-in connection may have a special three-dimensional form which continuously adjoins the pushbutton in its release position, so that this release position can also be detected haptically, which is particularly advantageous during usage under difficult light conditions e.g. in a stage area.

On transfer to its release position, the pushbutton together with the plug-in connector housing may generate an audible noise which from experience—or according to empirical tests—is associated with release by the majority of users. Alternatively or additionally, also a noise usually perceived as latching may be produced on locking.

These are merely some examples; a plurality of similar designs to facilitate operation are known to the person skilled in the corresponding art.

BRIEF DESCRIPTION OF THE DRAWINGS

An exemplary embodiment of the invention is shown in the drawings and explained in more detail below. The drawings show.

The figures contain partially simplified, diagrammatic depictions. In some cases, identical reference signs are used for similar but not always identical elements. Different views of the same elements may be scaled differently.

DETAILED DESCRIPTION

Figure 1A:
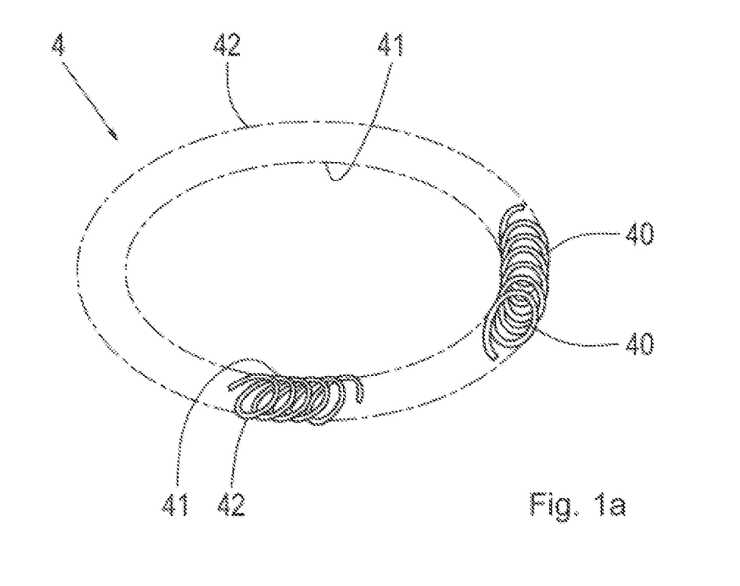
FIG. 1a an asymmetric, annular coil spring according to the prior art.
Figure 1B:
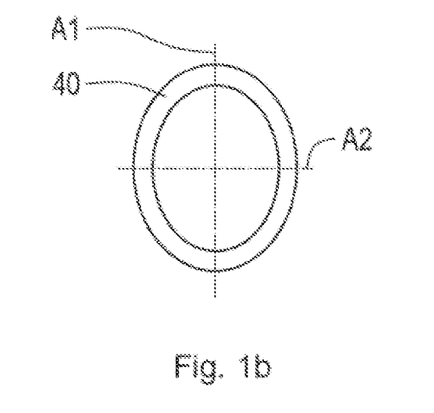
FIG. 1b, c the above-mentioned coil spring in two different views.
Figure 1C:
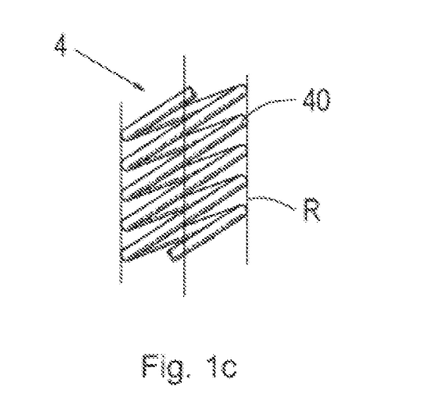

FIGS. 1a-c show an asymmetric, annular coil spring 4 according to the prior art. FIG. 1a shows only portions of the coil spring 4 in its actual form; in fact, it runs in the form of a closed ring, which in the drawing is indicated by means of a dotted line. The individual coils 40 each have an oval form with a large axis A1 and a small axis A2 which are depicted and marked in FIG. 1b. FIG. 1c shows a coil spring 4 from the side. A greatly inclined position relative to the ring plane R can dearly be seen.

FIGS. 2a-d show a locking and release use of such a coil spring 4 according to the prior art.

Figure 2A:
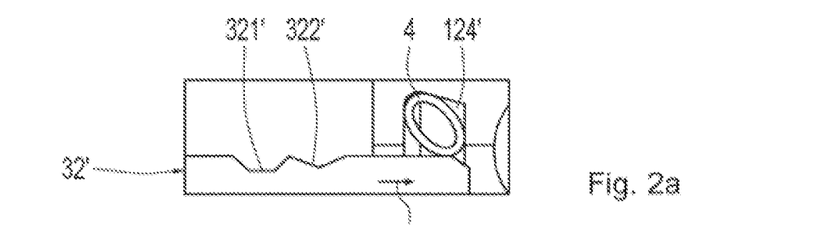
FIG. 2a-d a locking and release use of such a coil spring according to the prior art.
Figure 2B:
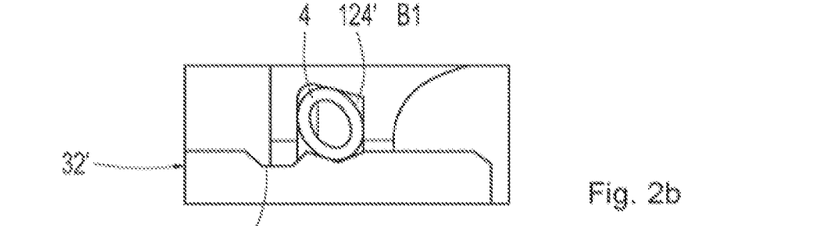
Figure 2C:
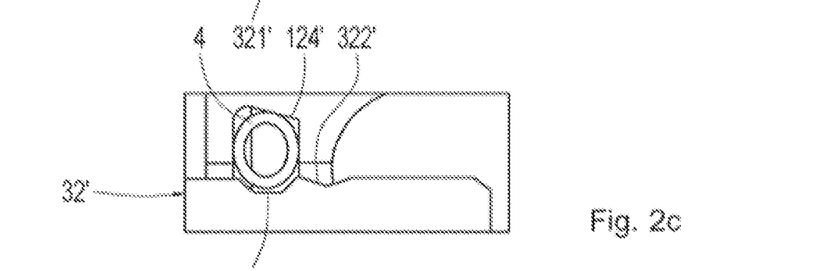

A mechanical connector, depicted at least in portions, as shown in FIG. 2a, has a pin 32' arranged in a housing bore 12' of a plug-in connector housing 11. The housing bore 12' has a housing channel 124' with the asymmetric coil spring 4 arranged therein. The pin 32' has two grooves, namely a locking groove 322' and a release groove 321'. As also shown in FIG. 2b, the coil spring 4 is held in a locking orientation by the housing channel 124' and the locking groove 322', i.e. its large axis A1 is sloping to the left in the drawing. The release groove 321' of the pin 32' serves to receive the canted coil spring 4, as shown in FIG. 2c, in a second rotation angle when the pin 32' is inserted more deeply into the plug-in connector housing 11 in a first movement direction B1.

In principle, the coil spring 4 may assume at least two orientations. In its locking orientation, as depicted for example in FIGS. 2a and 2b, the pin 32' may be inserted into the plug-in connector housing 11 in the first movement direction B1. At the same time, in this locking orientation, the coil spring 4 prevents the pin 32' from being withdrawn from the plug-in connector housing 11 contrary to the insertion direction. In other words, movement of the pin 32' in a second movement direction B2 is prevented, wherein the second movement direction B2 is opposite the first movement direction B1.

Figure 2D:
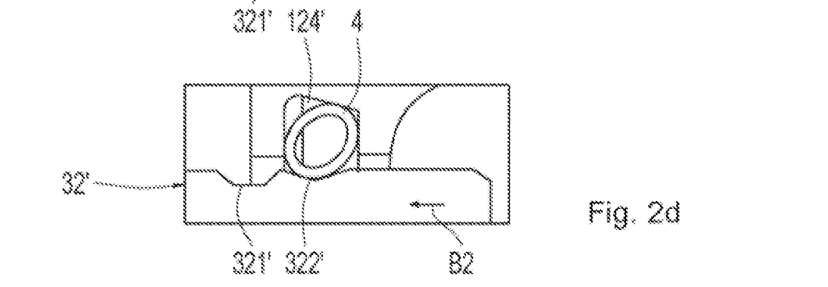

In contrast to this, in a release orientation of the coil spring 4 as shown in FIG. 2d, the pin 32' may be withdrawn from the plug-in connector housing 11 against the insertion direction, i.e. in the second movement direction B2. At the same time, deeper insertion in the first movement direction B1 is prevented.

Figure 3A:
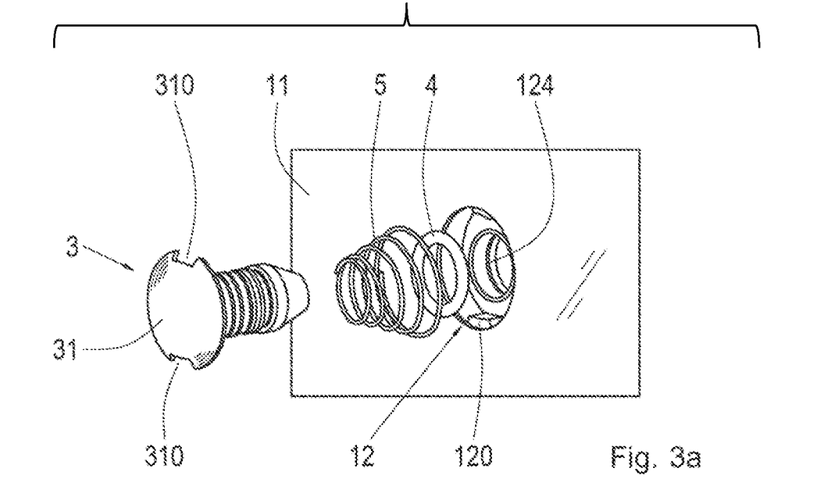
FIG. 3a a locking device in an exploded view.

FIG. 3a shows a locking device of a plug-in connector housing 11 in an exploded view. For this locking device, the plug-in connector housing 11—shown here only partially—has a passage opening 12. The locking device also has an asymmetric coil spring 4 (here indicated merely diagrammatically), a further spring element which here is a conical spring 5, and a pushbutton 3.

Figures 3B, 3C:
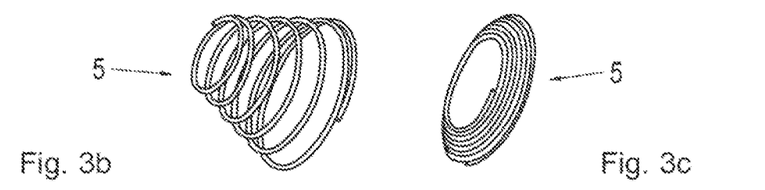
FIG. 3b-c a conical spring of the locking device.

FIGS. 3b and 3c show the conical spring 5 in the relaxed and in the compressed state. The conical spring 5 serves to exert a corresponding return force on the inserted pushbutton 3 in order to press it out of the plug-in connector housing 11 for release when required.

Figure 3D:
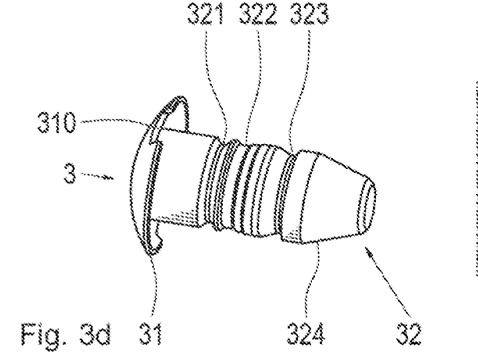
FIG. 3d a pushbutton of the locking device with a pushbutton head and a pushbutton pin with several circumferential grooves.

FIG. 3d shows the pushbutton 3 in detail. The pushbutton 3 at one end has a substantially plate-like pushbutton head 31. Opposite the pushbutton head 31, the pushbutton 3 has a freestanding end 324 which has a conical shape.

Two polarization recesses 310 are arranged opposite each other on the edge of the pushbutton head 31. A pushbutton pin 32 adjoins the pushbutton head 31. A release groove 321, a locking groove 322 and a holding groove 323 are each arranged circumferentially on the pushbutton pin 32. The release groove 321 and the holding groove 323 are each deeper than the locking groove 322.

Figure 3E:
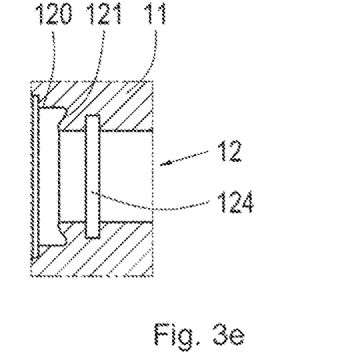
FIG. 3e a passage opening of a plug-in connector housing with a channel, an inner contour and two polarization pegs.

FIG. 3e shows the passage opening 12 arranged in the plug-in connector housing 11, namely in a housing wall of the plug-in connector housing 11. Two mutually opposing polarization pegs 120 are arranged therein for cooperation with the pushbutton head 31, in particular the polarization recesses 310 arranged therein.

Because of the polarization pegs 120, the mounted pushbutton 3, starting from its holding position releasing the plug-in connection, may initially be inserted into the plug-in connector housing 11 only by a first distance, namely until its pushbutton head 31 stops against the polarization pegs 120. In this state, the pushbutton 3 is in its locking position relative to the plug-in connector housing 11 and also in its locking attitude. In order now to be able to press the pushbutton 3 into the plug-in connector housing 11 by an additional second distance, it is firstly necessary to turn the pushbutton from its locking attitude into its release attitude, i.e. to bring the polarization recesses 310 of the pushbutton head 31 into the vicinity of the polarization pegs 120 by rotating the pushbutton 3 about the axis of symmetry of its pushbutton pin 32, so that the polarization recesses 310 surround the polarization pegs 120 on further pressing in, which is now possible.

Adjacent to the polarization pegs 120, in its passage opening 12, the plug-in connector housing 11 has an inner contour 121 in the form of a concentric annular constriction. When the pushbutton 3 has already been inserted by the second distance, this inner contour 121 definitively prevents even deeper insertion of the pushbutton 3, at least indirectly. In the present example, only the further spring element, namely the conical spring 5, is arranged between the pushbutton head 3 and the inner contour 121, and is finally compressed to a maximum by the further pressing-in of the pushbutton 3. In this position, the pushbutton 3 is inserted as deeply as possible into the plug-in connector housing 11.

At the same time, the asymmetric coil spring 4, which is arranged with its outer region 42 in a housing channel 124 of the passage opening 12, dips with its inner region 41 into the release groove 321 of the pushbutton pin 32, in order thus to tilt into its release attitude and allow release in collaboration with the conical spring 5.

FIGS. 4a to 4f illustrate this process in a cross-sectional depiction.

Figure 4A:
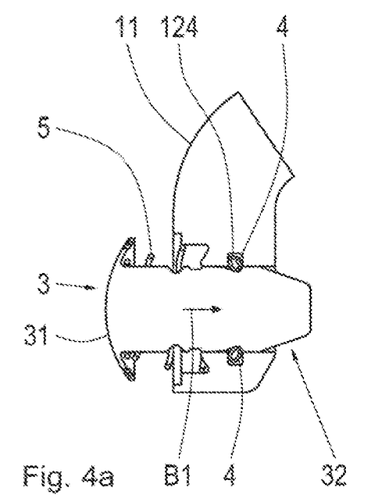
FIG. 4a-f the process of locking and release in cross-section through the locking device.
Figure 4B:
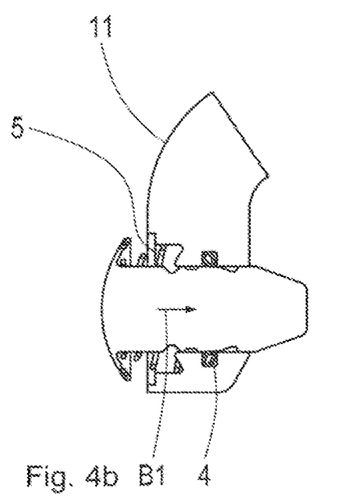

FIG. 4a shows the pushbutton 4, which initially is to be inserted with its pushbutton pin 32 deeper into the passage opening 12 of the plug-in connector housing 11 in the insertion direction from its holding position shown. The annular asymmetric coil spring 4 is arranged with its outer region 41 in the housing channel 124 of the passage opening 12. It is oriented in its locking orientation, i.e. it only allows a movement of the pushbutton 3 in a first movement direction B1, namely the insertion direction, but prevents movement in the second movement direction B2 which is opposite the first movement direction B1. In the holding position shown of the pushbutton, the coil spring 4 is arranged with its inner region 41 in the holding groove 323 in this position of the pushbutton 3. In principle, in this position said spring may be oriented both in its locking orientation and in its release orientation, since it could tilt between these two orientations under corresponding movement of the pushbutton 3. However, to assume its locking orientation it requires at least a substantial force to withdraw the pushbutton 3 from the plug-in connector housing 11, so this cannot take place unintentionally. In the present example, the coil spring 4 is however shown in its locking orientation, i.e. it thus allows further insertion of the pushbutton 3 into the plug-in connector housing 11 as shown in FIG. 4b.

Figure 4C:
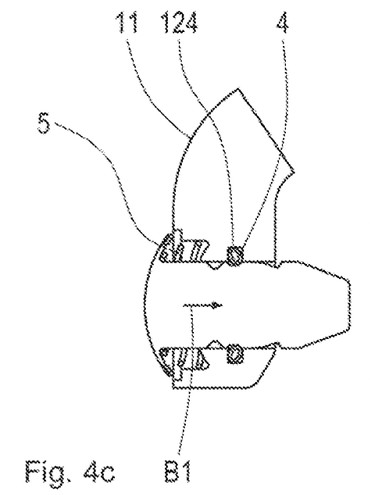

FIG. 4c shows how the pushbutton 3 is inserted into the plug-in connector housing 11 by a first distance, whereby the coil spring 4 with its inner region 41 engages in the locking groove 322. Because of the locking groove 322, the security against extraction of the pushbutton 3 from the plug-in connector housing 11 is further amplified. The pushbutton 3 is therefore in a position locking the plug-in connection, i.e. in this position, the pushbutton 3 can lock the plug-in connector housing 11 to a counter plug-in connector housing 21 (not shown here).

Figure 4D:
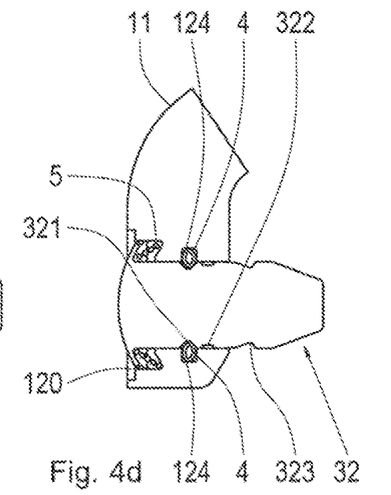

FIG. 4d shows the following: by further insertion of the pushbutton 3 by an additional second distance, the coil spring with its inner region 41 reaches into the release groove 321. Since the release groove 321 is larger than the locking groove 322, the coil spring 4 may now be tilted from its locking orientation into its release orientation by a slight movement of the pushbutton 3 out of the plug-in connector housing 11. Thus the coil spring 4 is here shown in an intermediate position in which it is in the process of tilting from its locking orientation to its release orientation.

Figure 4E:
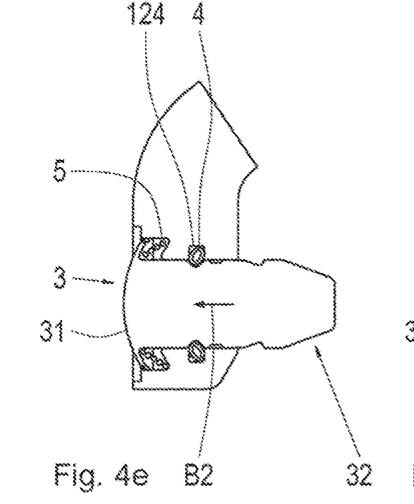

FIG. 4e shows the pushbutton 3 in almost the same position, and differs from the previous depiction merely in that the coil spring 4 is oriented into its release orientation by an extremely slight movement of the pushbutton 3 out of the plug-in connector housing 11.

Figure 4F:
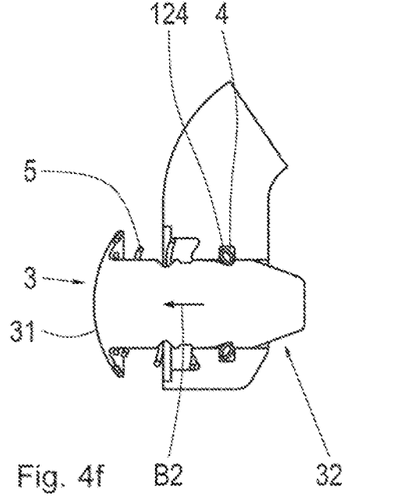

FIG. 4f shows how the pushbutton 3 was moved out of the plug-in connector housing 11 by the first and second distances, in comparison with the previous depiction. The pushbutton 3 is thus in its release position. The coil spring 4 at the same time is again arranged with its inner region 41 in the holding groove 323 and furthermore has already been brought into its locking orientation again by e.g. a manual, extremely slight pressing-in of the pushbutton 3. In this position too, it can oppose extraction of the pushbutton 3 by a substantial resistance from the contour of the holding groove 323, so that such extraction does not take place unintentionally.

Figure 4G:
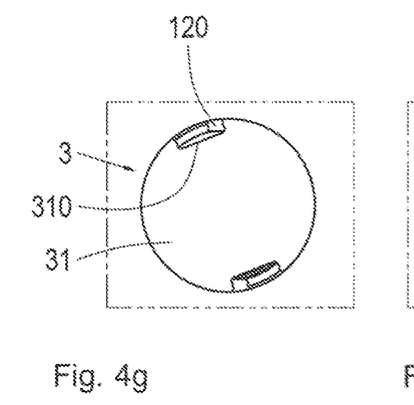
FIG. 4g, h the pushbutton head in a top view, in a locking and a release position.

FIG. 4g shows the pushbutton 3 in a top view onto the pushbutton head 31, i.e. the direction of observation corresponds to the axis of symmetry of the pushbutton pin 32. The pushbutton 3 is in its locking position, since its polarization recesses 310 are not yet in the vicinity of the polarization pegs 120, i.e. in front of the polarization pegs 120 in the observation direction. In simple terms, the pushbutton 3 is twisted into its locking position relative to its release position. Firstly, on an attempt to press the pushbutton 3 deeper into the plug-in connector housing 11, the pushbutton head 31 abuts against the polarization pegs 120 or at least against a region of the polarization pegs 120. Secondly, as shown in FIG. 4c, at the same time the coil spring 4 is oriented in its locking orientation and arranged with its inner region 41 in the locking groove 322. It thereby also prevents a movement of the pushbutton 3 out of the plug-in connector housing 11. The pushbutton 3 is thus in its locking position. Now it can neither be moved out of the plug-in connector housing 11 in the second movement direction B2 nor be moved more deeply into the plug-in connector housing 11 in the first movement direction B1. In this locking position, it can lock the plug-in connector housing 11, e.g. to a counter plug-in connector housing 21 not shown here. This may be achieved for example in that its freestanding end 324 engages in a recess of the counter plug-in connector housing 21, or in that it actuates a corresponding mechanism which ideally locks the plug-in connector housing 11 and the counter plug-in connector housing 21 together and presses them tightly against each other.

Figure 4H:
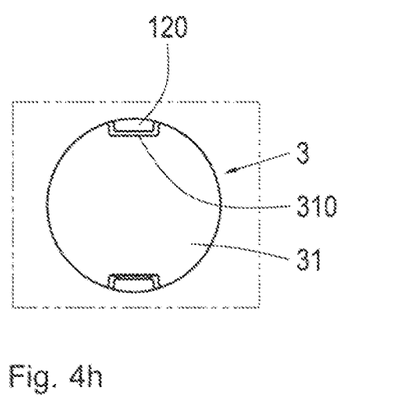

FIG. 4h shows the pushbutton 3 in the same view in a release position. The pushbutton 3 is here twisted slightly to the right, in comparison with the previous depiction, about the axis of symmetry of the pushbutton pin 32. It is clearly evident that the polarization recesses 310 in the observation direction are now arranged directly in front of the polarization pegs 120, i.e. in the vicinity of the polarization pegs 120. As a result, it is possible to press the pushbutton 3 into the plug-in connector housing 11 by the second distance, in that the polarization recesses 310 of the pushbutton head 31 surround the respective polarization pegs 120. The pushbutton 3 can thus move out of its locking position, shown in FIG. 4c, into a position shown in FIG. 4d.

Figure 5A:
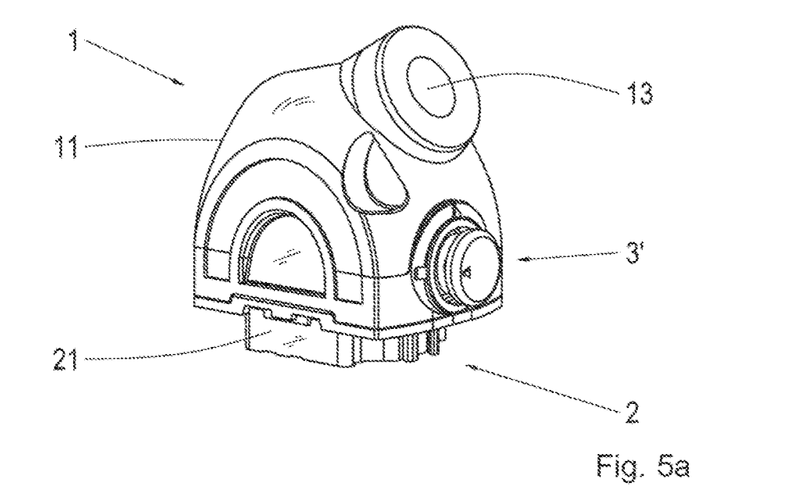
FIG. 5a-c a plug-in connection with two pushbuttons which are released, locked and oriented for release.
Figure 5B:
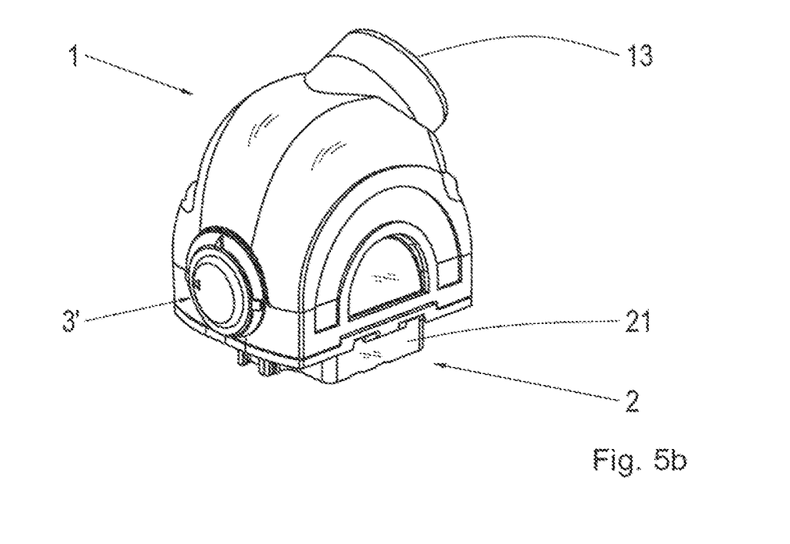
Figure 5C:
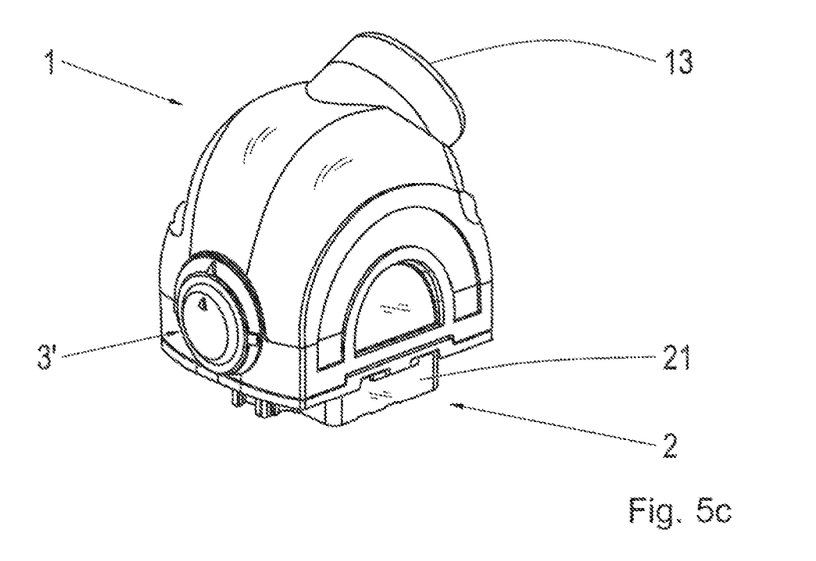

FIGS. 5a to 5c show a plug-in connection comprising the plug-in connector housing 11 together with a counter plug-in connector housing 21 connected thereto. On each of two opposing sides, the plug-in connector housing 11 has, as well as a cable insertion opening 32, an above-mentioned locking device comprising amongst others the pushbutton 3' which is here present in a second embodiment. The second embodiment of the pushbutton 3' differs from the above-mentioned embodiment 3 in that the polarization recesses 310 are, for design reasons, covered from the respective observation direction, i.e. viewed from the outside. To facilitate operation, the pushbutton 3' is marked with a triangle as an arrow marking in order to identify its locking and release positions. Furthermore, in the region of the passage opening 12, the plug-in connector housing 11 has a further triangle as an arrow marking and, at a right-angled angular distance therefrom, a square as a locking symbol.

In FIG. 5a, the pushbutton 3' is shown in its locking position. This is indicated in that the arrow direction of the pushbutton 3' does not correlate with the arrow direction of the plug-in connector housing 1. Instead, the arrow of the pushbutton 3' points in the direction of the square locking symbol of the plug-in connector housing 11.

In FIG. 5b, the pushbutton 3' is pressed into the plug-in connector housing 11 by the first distance. Since it is in its locking attitude, its pushbutton head 31 abuts against the polarization pegs 120 which are not visible in this depiction. As a result, it cannot be pressed more deeply into the plug-in connector housing 11.

Due to this pressing-in, the freestanding end 324 of the pushbutton 3 can for example reach into the counter plug-in connector housing 21 through a locking opening (not shown) of the counter plug-in connector housing 21, and lock the plug-in connector housing 11 and the counter plug-in connector housing 21 together, and ideally press them tightly against each other. This may be achieved both by simple engagement and in particular by the conical shape of its freestanding end. Alternatively or additionally, this may also be optimized by cooperation with a special additional mechanism.

In FIG. 5c, the pushbutton 3' is turned into its release position, wherein its arrow symbol points in the direction of the arrow symbol of the plug-in connector housing 11. In this release position, the polarization recesses 310 (not visible in this depiction) of the pushbutton 3 are arranged in the vicinity of the polarization pegs 120. Thus it is possible now to press the pushbutton 3' further into the passage opening 12 of the plug-in connector housing 11 by the second distance, wherein the polarization recesses 310 of the pushbutton head 31 surround the polarization pegs 120. As a result, as already described above, the pushbutton 3' may be unlatched from the plug-in connector housing 11 and pressed out of the plug-in connector housing 11 by the conical spring 5. Thus finally, the plug-in connector housing 11 may be released from the counter plug-in connector housing 21.

Although various aspects or features of the invention are shown in combination in the figures, it is evident to the person skilled in the art—unless specified otherwise—that the combinations depicted and discussed are not the only ones possible. In particular, corresponding units or feature groups from different exemplary embodiments may be interchanged.

LIST OF REFERENCE SIGNS

1 Plug-in connector
11 Plug-in connector housing
12, 12' Passage opening, housing bore
120 Polarization peg
121 Inner contour
124, 124' Housing channel
13 Cable insertion opening
2 Counter plug-in connector
21 Counter plug-in connector housing
3, 3' Pushbutton
31 Pushbutton head
310 Polarization recess
32, 32' Pushbutton pin, pin
321, 321' Release groove
322, 322' Locking groove
323 Holding groove
324 Freestanding end of pushbutton pin
4 Asymmetric coil spring
40 Individual coils of asymmetric coil spring
41 Inner region of asymmetric coil spring
42 Outer region of asymmetric coil spring
5 Further spring element, conical spring
A1 Large axis of individual coils
A2 Small axis of individual coils
B1 First movement direction in insertion direction
B2 Second movement direction against insertion direction
R Ring plane of coil spring

The invention claimed is:

1. A plug-in connector comprising:
a plug-in connector housing with at least one passage opening having a housing channel;
at least one pushbutton having a pushbutton pin which is arranged at least partially in the at least one passage opening and has at least two circumferential grooves, namely a locking groove and a release groove;
an annular, asymmetric coil spring which is arranged in each passage opening with its outer region in the housing channel and which is configured to assume at least two different orientations relative to the passage opening and to the pushbutton pin, namely a locking orientation and a release orientation,
wherein in its locking orientation, the asymmetric coil spring allows the pushbutton pin to move into the plug-in connector housing and prevents the pushbutton pin from moving out of the plug-in connector housing, and
wherein in its release orientation, the asymmetric coil spring allows the pushbutton pin to move out of the plug-in connector housing and prevents the pushbutton pin from moving into the plug-in connector housing, and
wherein the asymmetric coil spring is configured to be tilted from its locking orientation into its release orientation when it is arranged with its inner region in the release groove,
wherein
the pushbutton pin also has a third circumferential groove, namely a holding groove,
wherein the asymmetric coil spring is configured to be tilted from its release orientation into its locking orientation when it is arranged with its inner region in the holding groove, and
wherein the plug-in connector furthermore has at least one additional spring element configured for automatically moving the pushbutton out of the plug-in connector housing, wherein the additional spring element is a conical spring.

2. The plug-in connector as claimed in claim 1, wherein the release groove and the holding groove are each deeper than the locking groove.

3. The plug-in connector as claimed in claim 2, wherein the release groove and the holding groove are each wider than the locking groove.

4. The plug-in connector as claimed in claim 2, wherein the locking groove is arranged on the pushbutton pin between the release groove and the holding groove.

5. The plug-in connector as claimed in claim 2, wherein the pushbutton is configured to be locked in a position in the passage opening locking the plug-in connector housing, in that the inner region of the coil spring oriented in its locking orientation is arranged in the locking groove.

6. The plug-in connector as claimed in claim 1, wherein the release groove and the holding groove are each wider than the locking groove.

7. The plug-in connector as claimed in claim 6, wherein the locking groove is arranged on the pushbutton pin between the release groove and the holding groove.

8. The plug-in connector as claimed in claim 6, wherein the pushbutton is configured to be locked in a position in the passage opening locking the plug-in connector housing, in that the inner region of the asymmetric coil spring oriented in its locking orientation is arranged in the locking groove.

9. The plug-in connector as claimed in claim 1, wherein the locking groove is arranged on the pushbutton pin between the release groove and the holding groove.

10. The plug-in connector as claimed in claim 1, wherein the pushbutton is configured to be locked in a position in the passage opening locking the plug-in connector housing, in that the inner region of the asymmetric coil spring oriented in its locking orientation is arranged in the locking groove.

11. The plug-in connector as claimed in claim 1, wherein the asymmetric coil spring is configured to be tilted from its locking orientation into its release orientation by a movement of the pushbutton pin out of the plug-in connector housing while said asymmetric coil spring is arranged with its inner region in the release groove, and also to be tilted from its release orientation into its locking orientation by a movement of the pushbutton pin into the plug-in connector housing while said asymmetric coil spring is arranged with its inner region in the holding groove.

12. The plug-in connector as claimed in claim 1, wherein the pushbutton has a pushbutton head with a diameter which is greater than the diameter of the pushbutton pin, wherein the pushbutton head has at least one polarization recess configured to cooperate with at least one polarization peg of the passage opening, so that the pushbutton can only be inserted sufficiently deeply into the plug-in connector housing to bring the asymmetric coil spring, which has its outer region engaged in the housing channel, with its inner region into the release groove when the pushbutton has previously been oriented into a suitable release attitude by rotation about the axis of its pushbutton pin.

13. The plug-in connector as claimed in claim 1, wherein the plug-in connector is a rectangular plug-in connector, wherein the plug-in connector housing has two mutually opposing parallel wide sides and, at right angles thereto, two mutually opposing parallel narrow sides, wherein the plug-in connector housing has two passage openings, one of which is arranged in each of the two narrow sides, wherein the plug-in connector furthermore has two pushbuttons and two asymmetric coil springs, wherein a pushbutton with its pushbutton pin and one of the asymmetric coil springs is arranged in each of the passage openings.

14. The plug-in connector as claimed in claim 1, wherein the plug-in connector furthermore has at least one contact carrier fixed in the plug-in connector housing, at least one electrical and/or optical and/or pneumatic contact arranged in the contact carrier with a plug-in region and a cable connecting region, and at least one cable insertion opening arranged in the plug-in connector housing and configured for insertion of at least one cable to be connected to the cable connecting region of the at least one contact.

15. A plug-in connection, formed by a plug-in connector as claimed in claim 1, and a counter plug-in connector configured to be locked thereto, wherein the counter plug-in connector has a counter plug-in connector housing, wherein the counter plug-in connector housing has at least one locking opening in which the pushbutton pin of at least one pushbutton of the plug-in connector engages in the locked state.

16. A method for locking a plug-in connector housing to a counter plug-in connector housing, said method comprising the following steps:
  A. providing a plug-in connector comprising a plug-in connector housing as claimed in claim 1;
  B. joining the plug-in connector housing to the counter plug-in connector housing;
  C. pressing a pushbutton into the plug-in connector housing in a first direction by a first distance, wherein
    c1. a pushbutton pin of the pushbutton is pressed into a passage opening of the plug-in connector housing, whereby
    c2. an annular, asymmetric coil spring which is arranged with its outer region in a housing channel of the passage opening and is arranged with its inner region in a circumferential holding groove of the pushbutton pin, initially in its release orientation, is tilted into its locking orientation, whereupon
  D. the asymmetric coil spring moves along the pushbutton pin relative thereto by the first distance and thus is brought into its locking orientation with its inner region in a circumferential locking groove of the pushbutton pin, in order thereby to lock the plug-in connector housing to the counter plug-in connector housing.

17. The method for releasing a plug-in connector housing, previously locked as claimed in claim 16, from the counter plug-in connector housing, said method comprising the following steps:
  E. rotation of the pushbutton about an axis of symmetry of its pushbutton pin into a release position, wherein
    e1. at least one polarization recess of the pushbutton pin is brought into the vicinity of the at least one polarization peg of the passage opening,
  F. further pressing of the pushbutton into the passage opening of the plug-in connector housing in the first direction by a second distance, wherein
    f1. the pushbutton head also dips into the passage opening, wherein its at least one polarization recess surrounds the at least one polarization peg of the passage opening, and wherein
    f2. the inner region of the asymmetric coil spring, oriented in its locking orientation, is withdrawn from the circumferential locking groove of the locking pin of the pushbutton and moved along the pushbutton pin by the second distance to reach the release groove of the pushbutton pin,
  G. whereupon
    g1. an even deeper pressing-in of the pushbutton is prevented by an inner contour of the passage opening, while at the same time
    g2. the asymmetric coil spring, oriented in its locking orientation, dips with its inner region into the release groove,
  H. whereupon
    h1. a further spring element comprising a conical spring moves the pushbutton initially only slightly in the second direction opposite the first direction, wherein
    h2. the asymmetric coil spring, with its inner region arranged in the release groove, is tilted from its locking orientation into its release orientation, whereupon
  I. the pushbutton head is pressed by the second conical spring element out of the plug-in connector housing in the second direction both by the second distance and by the first distance, until finally
  J. the inner region of the asymmetric coil spring dips into a holding groove of the pushbutton pin and holds the pushbutton in its release position on the plug-in connector housing, whereby
  K. the plug-in connector housing is released from the counter plug-in connector housing.

18. The method as claimed in claim 17, wherein in method step G, the prevention of the even deeper pressing-in of the pushbutton by the inner contour of the passage opening, described under step g1, is achieved in that the pushbutton head presses against a first end of the already fully compressed further spring element and thus is definitively prevented from moving even deeper into the plug-in connector housing by the inner contour against which the second end of the spring element abuts.

* * * * *